Patented July 21, 1925.

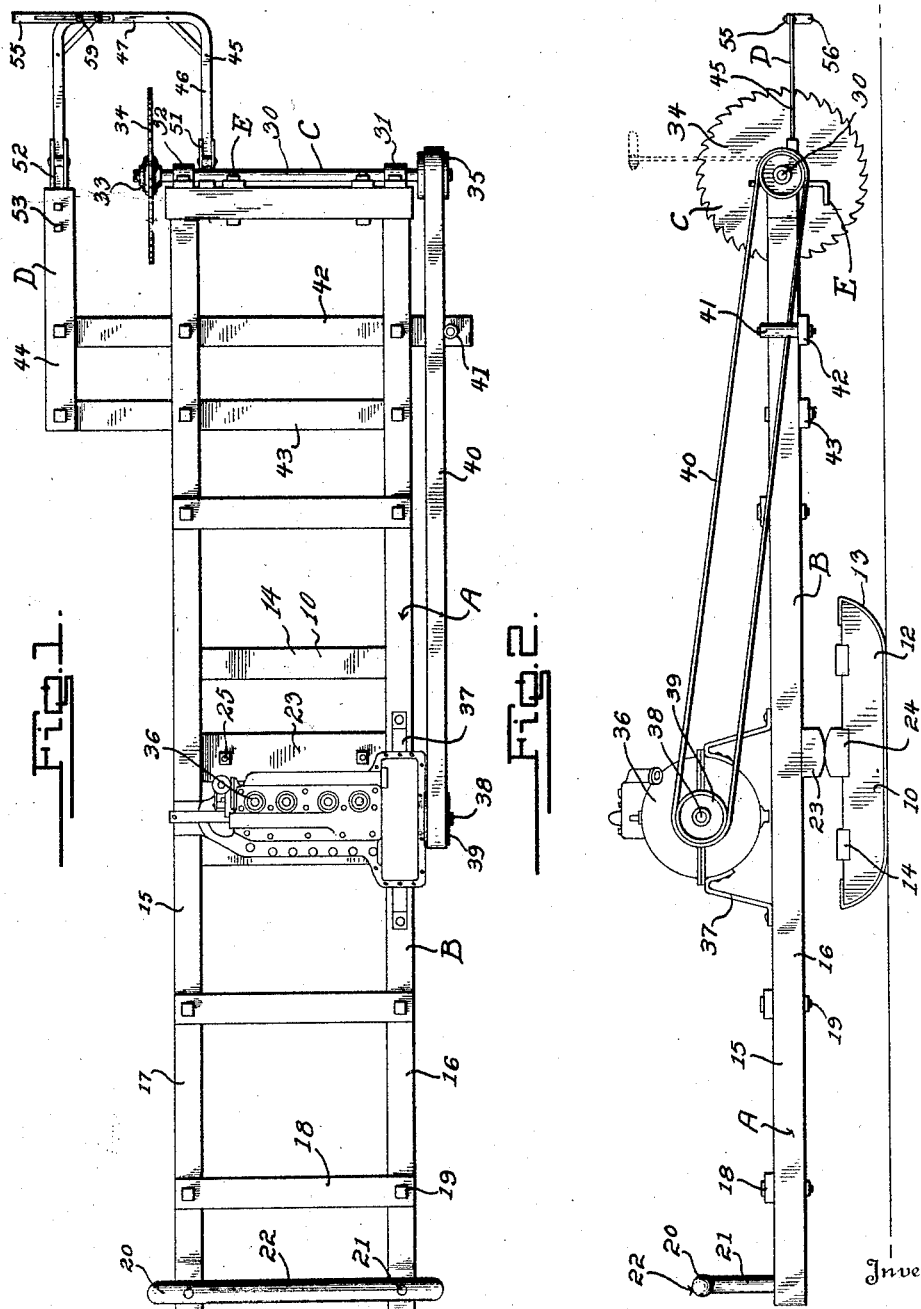

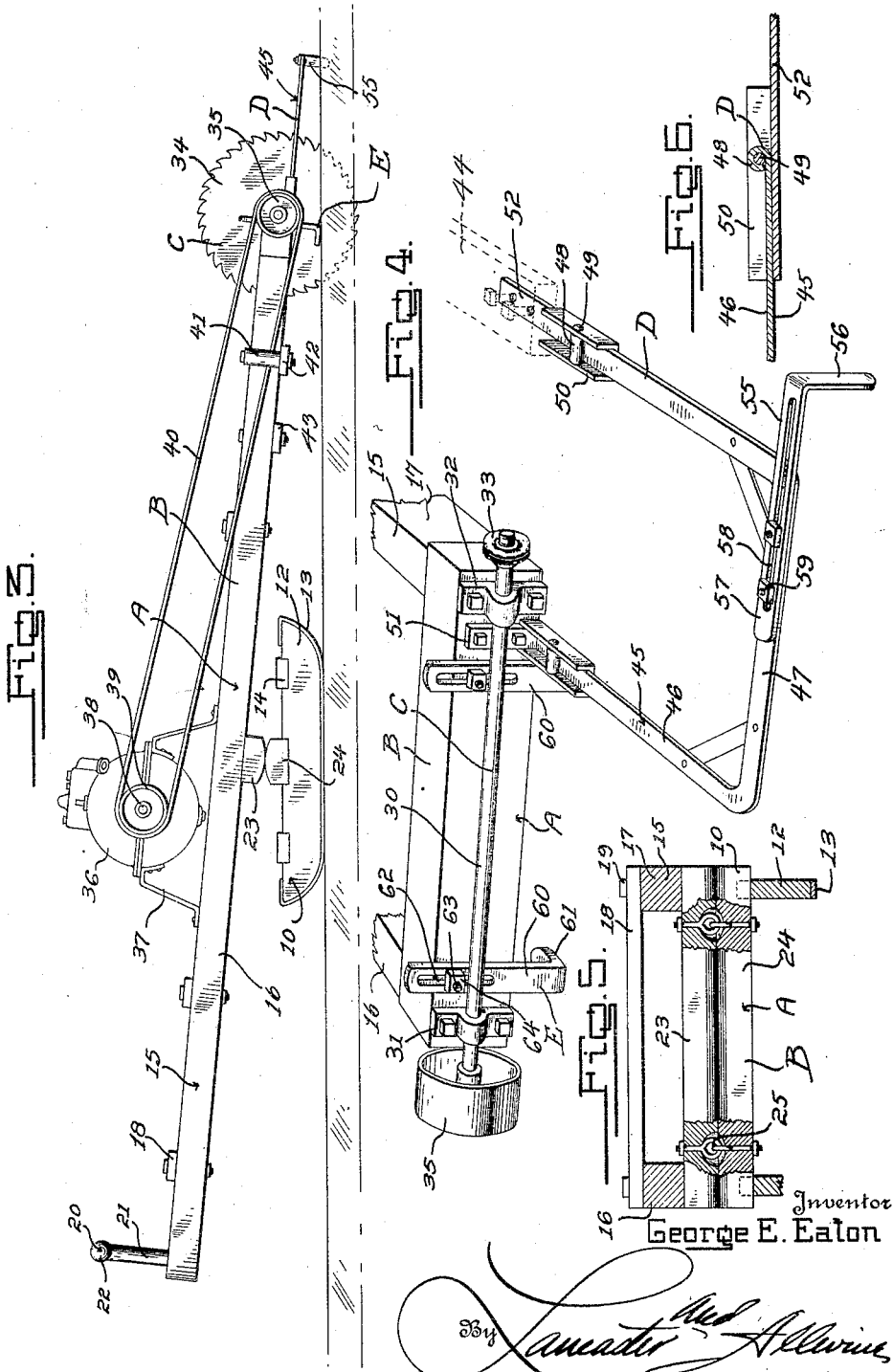

1,546,779

UNITED STATES PATENT OFFICE.

GEORGE E. EATON, OF DRESSER JUNCTION, WISCONSIN.

ICE-SAWING MACHINE.

Application filed May 18, 1922. Serial No. 561,896.

*To all whom it may concern:*

Be it known that I, GEORGE E. EATON, a citizen of the United States, residing at Dresser Junction, in the county of Polk and State of Wisconsin, have invented certain new and useful Improvements in Ice-Sawing Machines, of which the following is a specification.

This invention relates to ice cutting machines and the primary object of the present invention is to provide a novel machine embodying a rotary saw and a prime mover for actuating the saw, the saw and prime mover being mounted upon the supporting frame of the machine in a novel manner.

A further object of the invention is the provision of an improved ice cutting machine and a novel supporting frame embodying an under carriage consisting of sled runners, and a rockable platform, the platform having a circular saw operatively connected to its forward end and guiding handles secured to its rear end, the prime mover for the saw being disposed adjacent to the rockable support for the platform, whereby the platform can be easily rocked by the operator of the machine.

A further object of the invention is to provide a novel means for guiding the saw during the cutting operation, and novel means for gauging the depth of the saw cut, the said guiding and gauging means being adjustable so that different sized cakes of ice can be cut.

A further object of the invention is the provision of novel means for mounting the guiding frame of the saw upon the platform, so that the said platform can be swung up to an inoperative position when the device is not in use.

A still further object of the invention is to provide an improved ice cutting machine of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, forming a part of this specification, in which drawings:

Figure 1 is a top plan view of the improved ice cutting machine.

Figure 2 is a side elevation of the same.

Figure 3 is a side elevation of the improved machine showing the platform in its tilted position, with the saw in engagement with the ice to be cut.

Figure 4 is a fragmentary perspective view of the forward end of the platform of the machine, showing the guiding frame for the saw operatively connected thereto.

Figure 5 is a fragmentary transverse sectional view through the frame of the machine, illustrating the means of connecting the rocking platform with the under carriage or sleigh runners.

Figure 6 is a fragmentary detail longitudinal section through a portion of the guiding frame, illustrating the means of connecting the guiding frame with the forward end of the rocking platform.

Referring to the drawings in detail, wherein similar reference characters designate corresponding parts throughout the several views, the letter A generally indicates the improved ice cutting machine which consists of the frame B; the saw and operating mechanism C; the saw guiding means D; and the saw gauging means E.

The frame B comprises an under carriage 10 and a rocking platform 15. This under carriage consists of a pair of spaced sled runners 12, the active faces of which may be provided with metallic wear shoes 13. These runners are rigidly connected together by cross pieces 14, which are disposed adjacent to the terminals of the said runners.

The rocking frame 15 consists of a pair of spaced parallel disposed beams 16 and 17. These beams are connected at spaced points by cross braces 18. These cross braces 18 can be secured in any preferred manner to the longitudinal beams 16 and 17, such as by bolts 19. An operator's handle 20 is carried by the rear end of the rocking platform 15 and consists of uprights 21 which are secured to the beams 16 and 17 and a connecting handle bar 22. The rocking platform 15 is connected, intermediate its ends to the under carriage 10 for rocking movement and the lower surface of the platform 15 is provided with a transversely extending bolster 23, which is adapted to rest upon the transversely extending bolster 24 carried by the under carriage 10. The bolster 24 is located at a point substantially equi-distant of the ends of the under carriage. In order to permit the rocking movement of the platform 15, the meeting faces of the bolsters 23 and 24 are of arcuate configuration in cross section and are connected together by eye bolts 25 as clearly shown in Figure 5 of the drawings.

The saw and operating means C consists of a transversely extending arbor 30 which is disposed at the extreme forward end of the rocking platform 15, and this arbor 30 can be mounted for rotary movement in suitable bearing boxes 31 and 32. One end of the arbor 30 is provided with means 33 for detachably connecting a circular saw 34 thereto while the opposite end of the arbor has keyed or otherwise secured thereto a belt pulley 35.

The prime mover for operating the arbor 30 has been shown to be of the internal combustion engine type and is designated by the reference character 36. It is preferred to arrange the engine 36 adjacent to the point of rocking connection of the platform 15 with the under carriage 10, so that the platform can be conveniently rocked for bringing the saw 34 into or out of engagement with the ice to be cut. The engine 36 is secured to the platform 15 by suitable supporting legs or brackets 37, but it is to be understood that any suitable type of bed can be provided for the engine that may be desired. One end of the crank shaft 38 of the engine is provided with a drive pulley 39 which is in direct alignment with the pulley 35 keyed to the arbor 30 and these pulleys 39 and 35 have trained about the same, a drive pulley belt 40. A suitable pulley guide 41 is carried by the rocking frame adjacent to the pulley 35 so as to prevent the disengagement of the pulley belt 40 off of the pulley 35. This guide 41 can be secured to the extended end of a transversely extending beam 42, which forms in connection with the beam 43 a support for the saw guiding means D as will be hereinafter more fully described. The beams 42 and 43 extend laterally from the longitudinal beam 17 and have their terminals connected by a forwardly extending beam 44, the terminal of which ends substantially in alignment with the forward end of the rocking platform 15.

The guiding means D for the saw 34 includes a substantially U-shaped frame 45 which can be formed of strap iron or the like if so desired. This U-shaped frame consists of the rearwardly extending spaced parallel legs 46 and the forwardly disposed connecting or bight portion 47. The free terminals of the legs 46 are provided with eyes 48 which are adapted to receive the pins 49 carried by the upstanding side flanges 50 of the forwardly extending brackets 51 and 52. The bracket 51 is secured to the forward end of the rocking platform 15 and is of substantially right angular configuration. The bracket 52 is bolted or otherwise secured, as at 53 to the forward end of the forwardly extending bar 44. By this connection, it can be seen that the U-shaped frame 45 can be swung up to a substantially right angular position in relation to the platform 15 as shown in the dotted line position in Figure 2 of the drawings. The downward movement of this U-shaped frame 45 is limited, however, by the engagement of the arms 46 thereof with the brackets 51 and 52. Slidably supported upon the frame 45 is the guide 55 proper, which consists of the depending arm 56 which is adapted to engage in the saw kerf and the right angularly disposed connecting leg 57. This right angularly disposed leg 57 rests upon the connecting bar or bight portion 47 of the U-shaped frame 45 and is provided with a longitudinally extending slot 58, in which is adapted to be positioned the retaining bolts 59 therefor. It can be seen that by adjusting the bolts and the nuts therefor that the guide proper can be adjusted at any desired distance in relation to the rocking frame 15 and to the circular saw 34. This of course, gives the desired width to the blocks of ice to be cut.

The gauge means E for governing the depth of cut of the saw 34 includes a pair of depending legs 60. These legs 60 terminate in angularly extending feet 61 which are adapted to engage the upper surface of the ice being cut. These legs 60 are adjustably mounted upon the forward terminal of the rocking frame 15 and have the body portions thereof provided with vertical slots 62 in which are adapted to be positioned the adjusting bolts 63 carried by the forward end of the rocking frame. These bolts 63 have adjustably mounted thereon nuts 64 which are adapted to frictionally engage the outer surface of the legs 60. It is obvious that by loosening the nuts 64, the legs 60 can be raised or lowered, in order to effectively govern the depth of penetration of the saw 34 into the ice being cut.

In Figure 3 are shown the gauges in engagement with the upper surface of the ice for limiting the cut being made by the saw 34. This view also clearly shows the use of the guide D.

In use of the improved machine, a straight line is first marked upon the ice and the machine is then set in alignment with this mark, and the handle bar 22 is grasped by the operator, and the platform 15 rocked to bring the saw 34 into engagement with the ice. The engine 36 is, of course, started, and the machine is then pushed over the ice and the saw is kept in direct alignment with the line marked. Owing to the nature of the saw, the drawing of the machine over the ice will be comparatively easy and the depth of the saw cut is of course, governed by the setting of the legs 60 as heretobefore described.

After the first cut has been made, the machine is brought back to the starting point and the gauge arm 56 is adjusted in relation to the saw 34 according to the width of the strip of ice to be cut, after which the platform 15 is again rocked, so as to bring the saw 34 in engagement with the ice and the arm 56 into engagement with the saw kerf previously made by the saw 34. The guiding of the machine during this cut will, of course, be facilitated owing to the guide arm 56. This method is of course, followed until the desired amount of ice has been cut. It can be seen that when the end of the saw cut has been reached, that the foot 56 will automatically leave the saw kerf owing to the means of hingedly connecting the frame 45 with the rocking platform 15.

Changes in details may be made without departing from the spirit or scope of this invention; but,

I claim:

1. An ice cutting machine comprising an under carriage, a rocking platform carried by the under carriage and secured thereto intermediate its ends, a circular saw carried by the forward end of the platform, an operator's handle carried by the rear end of the platform, and a guide for the saw comprising a swinging frame hingedly connected with the forward end portion of said platform for vertical swinging movement into and out of an operative position in front of the saw, means for preventing further downward swinging of the frame when in an operative position, and a guiding arm slidably mounted upon said frame for movement transversely of the platform.

2. An ice sawing machine comprising a carriage, a rocking platform carried by said carriage, a saw carrying arbor rotatably carried by said platform, cross bars extending beyond one side of said platform, a supporting bar carried by said cross bars and extending longitudinally of the platform in spaced relation thereto, a saw carried by said arbor and positioned between the platform and supporting bar, brackets carried by the forward end portions of the supporting bar and platform and each having a forwardly extending channel portion provided with upwardly extending side flanges, a guide including a U-shaped frame having rearwardly extending arms extending between the side flanges of said brackets, pivot pins carried by the flanges and engaging the arms of said frame to pivotally mount the frame for vertical swinging movement into and out of an operative position, a guide strip adjustably connected with the U-shaped frame for movement transversely thereof and having one end portion extending beyond the frame and terminating in a depending arm, and means carried by said platform for imparting movement to said saw arbor.

GEORGE E. EATON.